United States Patent
Liu et al.

(10) Patent No.: US 8,877,269 B2
(45) Date of Patent: Nov. 4, 2014

(54) PROBIOTICS-CONTAINING SOYBEAN OLIGOSACCHARIDE PRODUCT AND PREPARATION THEREOF

(75) Inventors: Yu-Hui Liu, Taoyuan County (TW); Chien-Ti Chang, New Taipei (TW); Ming-Yu Hung, Nantou County (TW); Shiao-Cheng Chuang, Hsinchu (TW); Su-Er Liou, Hsinchu County (TW); Fu-Ning Chien, Taoyuan County (TW); Hsiang-Ling Lai, Miaoli County (TW); Yi-Hong Chen, Hsinchu (TW); Chu-Chin Chen, Hsinchu (TW)

(73) Assignee: Food Industry Research and Development Institute, Hsinchu (TW)

( * ) Notice: Subject to any disclaimer, the term of this patent is extended or adjusted under 35 U.S.C. 154(b) by 162 days.

(21) Appl. No.: 13/596,316

(22) Filed: Aug. 28, 2012

(65) Prior Publication Data

US 2013/0323360 A1     Dec. 5, 2013

(30) Foreign Application Priority Data

Jun. 4, 2012   (TW) .............................. 101120020 A

(51) Int. Cl.
| | | |
|---|---|---|
| *A23L 1/30* | (2006.01) | |
| *A23L 1/20* | (2006.01) | |
| *A23L 1/211* | (2006.01) | |

(52) U.S. Cl.
CPC .. *A23L 1/20* (2013.01); *A23L 1/211* (2013.01)
USPC .................................. 426/46; 426/61; 426/62

(58) Field of Classification Search
CPC ........... A23L 1/3014; A23L 1/30; A23L 1/00; A23L 1/09; A23L 1/2003; A23L 1/308; A23L 1/2006; A23L 1/20; A23L 1/211; A61K 31/702; A61K 35/744; A61K 35/741; A61K 1/702; A61K 2035/115; A61K 2035/11; A61K 2300/00; A61K 36/48; A61K 35/747; C12P 19/04; A23J 1/14; A23J 3/16; A23V 2002/00; A23V 2250/28; A23V 2250/632; A23V 2200/3204; A23V 2200/3202; A23V 2200/32; A23V 2200/30; A23C 1/02
USPC ........... 426/46, 61, 62, 52, 598, 629, 634, 56, 426/58, 48, 71, 648, 658, 7, 615, 103, 430; 424/93.45, 93.4, 93.1; 435/252.9, 853; 514/61
See application file for complete search history.

(56) References Cited

PUBLICATIONS

Li, Z. et al. CN 1840675-2006-English Abstract.*
Mital, B. K. et al. J. Food Sci. 40: 115-118 (1975).*
Crittenden, R. G. et al. Trends in Food Sci. and Technol. 7: 353-361 (1996).*
Yuan et al. Microbiology. Abstract. Jun. 2001.*
CN1840675 (Oct. 4, 2006)-Machine Translation.*
CN1840675 (Oct. 4, 2006)-English Abstract.*

* cited by examiner

*Primary Examiner* — Hamid R Badr
(74) *Attorney, Agent, or Firm* — Bacon & Thomas, PLLC

(57) ABSTRACT

Provided is a soybean oligosaccharide product containing acidic soluble saccharides of soybean and probiotics, which at least include fructose, glucose, sucrose, raffinose, and stachyose, with a percentage of the combined weight of raffinose and stachyose being at least 46%, a weight percentage of fructose being not greater than 8.5%, and a weight percentage of glucose being not greater than 1.0%, based on the total weight of fructose, glucose, sucrose, raffinose, and stachyose. The soybean oligosaccharide product is prepared by extracting a soybean raw material with water under a pH of 3-6 and at a temperature of 50-70° C. to obtain an extract containing acidic soluble saccharides of soybean, and inoculating and fermenting the extract with probiotics that are able to decompose monosaccharides and disaccharides, but substantially not able to decompose trisaccharides or tetrasaccharides.

22 Claims, No Drawings

PROBIOTICS-CONTAINING SOYBEAN OLIGOSACCHARIDE PRODUCT AND PREPARATION THEREOF

FIELD OF THE INVENTION

The invention relates to a probiotics-containing soybean oligosaccharide product and preparation thereof, and more particularly to a probiotics-containing soybean oligosaccharide product resulted from subjecting soybean raw materials to acid extraction, removal of impurities, desalination, and inoculation of probiotics to facilitate fermentation.

BACKGROUND OF THE INVENTION

The intestines are the main digestive organ of the human body, and also play an important role in our immune system. The species of bacteria found in the intestines are diverse, with both beneficial and undesirable bacteria present. Many relevant studies have shown that an increase of probiotic bacteria in the intestines induces beneficial effects on human health, such as preventing the growth of undesirable bacteria, improving intestinal peristalsis, enhancing immunity, and preventing cancers (Gibson and Roberfroid, 1995). Moreover, studies have shown that the intestinal bacteria also help control the metabolism of fats. Whenever the intestinal microbiota is out of balance, it generally leads to low-grade chronic inflammation throughout the human body, which consequently increases the occurrence of obesity and metabolic disorders (Cani and Delzenne, 2009). Therefore, the intestinal bacteria are of vital importance to the human body. Generally, the intestinal microbiota may be improved by the intake of health supplements, which can be divided into the following three categories: probiotics, prebiotics, and synbiotics, which is the combination of probiotics and prebiotics.

Soybean oligosaccharides are common prebiotics; a naturally occurring soybean oligosaccharide is consisted of raffinose and stachyose. It is a sweetener that is low in sweetness and calories, and can be used as a substitute for sucrose in functional foods or low-calorie foods. Because it does not induce the secretion of insulin after intake, the diabetes patients can consume it without concerns. The main components of the soybean oligosaccharides are not absorbed in the intestines, but utilized in the bowel section, where the majority of the bacteria flora is present. Relevant studies have shown that harmful bacteria like *Escherichia coli* cannot utilize the oligosaccharides, and its growth is suppressed instead. In addition, soybean oligosaccharides are fermented or partially fermented in the bowel to produce metabolites like short chain fatty acids (SCFA), acetate, propionate, and butyrate, which directly promote intestinal peristalsis and facilitate the passing of wastes. Acetate or butyrate are known to inhibit the growth and reproduction of harmful bacteria, which helps change the intestinal microbiota and make the intestines an ideal environment for the beneficial bacteria to multiply.

Generally speaking, the term probiotics is thought to be referring to bacteria only. But recent discoveries have indicated that the active substances derived from some of the probiotic bacteria also help promote the health of the host. Therefore, the term probiotics is now used to refer to the extracts of viable, dead and resident bacteria, as well as metabolites thereof Lactic acid bacteria are known to possess a number of biological functions and can be safely consumed by humans, thus making them an important material in the development of health supplementary products.

Lactic acid bacteria are considered the most significant group of bacteria in the category of probiotics, as the humans have a long history of consuming fermented dairy products, which means the lactic acid bacteria are generally safe to be consumed, and regarded as a best example of beneficial bacteria in human intestines. When lactic acid bacteria enter the intestines, they subsequently stimulate specific and non-specific immune responses from lymphatic tissues thereof, and the responses are affected by how well the bacterial bodies come into contact with the lymphatic tissues in the intestinal cavities. The lactic acid bacteria are thought to be effective only when they adhere to the intestines and reproduce. And some experiments showed that after stopping consuming lactic acid bacteria, the bacteria disappear within a few weeks and do not remain in the intestines. However, even short periods of adherence led to stimulations of the intestinal immune system, which was true even in patients who were taking antibiotics or suffering diarrhea. The intake of lactic acid bacteria helped re-establish the intestinal microbiota in the patients and restore the balance of the immune system. The lactic acid bacteria are therefore useful for treating intestinal disorders and inflammation, as they can promote the internal defensive mechanism and improve intestinal microbiota in the host. Past researches had indicated that the earlier a person consumes the lactic acid bacteria, the more likely it is for the bacteria to interact with the cell receptors of the host, and then the bacteria can establish themselves on the epithelial cell mucus layer to become symbiotic bacteria in the gut (Parvez et al., 2006). As the lactic acid bacteria play a critical role in determining the intestinal health of its human host, products based on the lactic acid bacteria or derived therefrom has become increasingly popular on the market (Chen et al., 2007). Currently, the commercial lactic acid bacteria products are most commonly based on probiotic bacteria strains like *Lactobacillus* sp., *Bifidobacterium* sp., as well as *Lactobacillus plantarum* (Parvez et al., 2006).

One of the common methods for fabricating synbiotics is to add probiotics into prebiotics, as disclosed in Japanese Patent No. JP2-200168, in which a lactic acid beverage is produced by using the saccharides-containing soybean steepwater resulted from the processing of soybean to make bean curd. However, the method uses only water to extract the soybean steepwater and fails to remove the particular odor of the soybean, and the resulted extracts are limited in volume, which is not cost-effective. Other methods had also been proposed to make synbiotics by adding probiotics (such as lactic acid bacteria) into prebiotics (such as soybean oligosaccharides), as seen in the Korean Patent No. KR 20020043078, which disclosed a composite probiotic, and in the Chinese Patent No. CN 101406489A and CN 101496583A, which disclosed a composite microbial inoculant and fabrication method thereof, and a nutritional food containing probiotics, respectively. The methods from the three patents fabricate the synbiotics by adding selected lactic acid bacteria composites into soybean oligosaccharides at specific ratios, but the composition of the soybean oligosaccharides are not defined clearly. Moreover, the amount of raffinose and stachyose are not described in any ways, but they are important in the selective replication of the intestinal bacteria. In addition, a method for fabricating extract liquids from fermented soybean was disclosed in the Taiwan Patent No. 252759; after obtaining soybean extract liquids by dissolving it using hot water, the liquids are added with lactic acid bacteria for further culturing, and then immune-regulating active substances are obtained by heat-sterilizing and filtering the fermented liquids, which are prebiotic substances only.

From the above examples we know that the current methods for fabricating synbiotics are still based on the addition of probiotics into prebiotics. Therefore, the inventors of this invention had proposed a method of inoculating probiotics into prebiotics to facilitate fermentation, and then directly using the fermented product as the synbiotics in response to the previous issues.

PRIOR ARTS REFERENCES

Patent References

1. Japanese Patent No. JP2-200168
2. Chinese Patent No. CN101406489A
3. Chinese Patent No. CN101496583A
4. Korean Patent No. KR 20020043078
5. Taiwan Patent No. 252759

Non-Patent References

1. Bang, M. H., Chio, O. S. and Kim, W. K. 2007. Soy oligosaccharide increases fecal bifidobacteria counts, short-chain fatty acids, and fecal lipid concentrations in young Korean women. 2007. J. Med. Food. 10: 366-370.
2. Campbell, J. M., Fahey, G. C. and Wolf, B. W. 1997. Selected indigestible oligosaccharides affect large bowel mass, cecal and fecal short chain fatty acids, pH and microflora in rats. J. Nutr. 127: 130-136.
3. Cani, P. D. and Delzenne, N. M. 2009. Interplay between obesity and associated metabolic disorders: new insights into the gut microbiota. Cur. Opin. Pharma. 9: 737-743.
4. Gibson, G R. and Roberfroid, M. B. 1995. Dietary modulation of the human colonic microbiota: introducing the concept of prebiotics. J. Nutr. 152: 1401-1412.
5. Parvez, S., Malik, K. A., Kang, S. A. and Kim, H. Y. 2006. Probiotics and their fermented food products are beneficial for health. J. Appl. Micro. 100: 1171-1185.
6. Smiricky-Tjardes, M. R., Flickinger, E. A., Grieshop, C. M., Bauer, L. L., Murphy, M. R. and Fahey, G C. 2003. In vitro fermentation characteristics of selected oligosaccharides by swine fecal microflora. J. Animal Sci. 81: 2505-2514.
7. Su, P., Henriksson, A. and Mitchell, H. 2007. Selected prebiotics support the growth of probiotic mono-cultures in vitro. Anaerobe. 13: 134-139.
8. Chen Qing-Yuan, Huang Chong-Zhen, Qiu Xue-Hui, Liao Qi-Cheng. 2007. The supplementary effects and product development of lactic acid bacteria. Food Biotechnology: 60-68.

SUMMARY OF THE INVENTION

It is one object of the present invention to provide a probiotics-containing soybean oligosaccharide product, which includes acidic soluble saccharides of soybean and probiotics, wherein the acidic soluble saccharides of soybean at least include fructose, glucose, sucrose, raffinose, and stachyose with a percentage of the combined weight of raffinose and stachyose being greater than 46%, a weight percentage of fructose being not greater than 8.5%, and a weight percentage of glucose being not greater than 1.0%, based on the total weight of fructose, glucose, sucrose, raffinose, and stachyose.

It is another object of the present invention to provide a method for preparing a probiotics-containing soybean oligosaccharide product, including extracting a soybean raw material with water under a pH of 3-6 and at a temperature of 50-70° C. to obtain an extract containing acidic soluble saccharides of soybean, and inoculating and fermenting the extract with probiotics that are able to decompose monosaccharides and disaccharides, but not trisaccharides or tetrasaccharides.

Preferably, the percentage of the combined weight of raffinose and stachyose in the soybean oligosaccharide product of the present invention is between 49-85%, and the weight percentage of glucose is not greater than 0.5%, based on the total weight of fructose, glucose, sucrose, raffinose, and stachyose. More preferably, the percentage of the combined weight of raffinose and stachyose is between 75-85%, based on the total weight of fructose, glucose, sucrose, raffinose, and stachyose.

Preferably, the probiotics contained in the soybean oligosaccharide product of the present invention are able to decompose monosaccharides and disaccharides, but not trisaccharides or tetrasaccharides.

Preferably, said probiotics may be *Pediococcus acidilactici, Lactobacillus delbrueckii, Lactobacillus plantarum, Lactobacillus fermentum, Lactococcus lactis*, or *Lactobacillus casei*, in which *L. plantarum* is most preferably used.

Preferably, the probiotics are is selected from the group consisting of yeast species of BCRC 20270 (*Saccharomyces cerevisiae*), 21403, 21468, 21469, 21727, 21480 (*Kluyveromyces marxianus*), and 21777 (*Pichia stipitis*).

Preferably, the probiotics of the soybean oligosaccharide product of the present invention are in an amount of $1.0 \times 10^9$ CFU/g-$9.9 \times 10^{10}$ CFU/g.

Preferably, the acidic soluble saccharides of soybean in the soybean oligosaccharide product of the present invention is obtained by extracting a soybean raw material with water under a pH of 3-6 and at a temperature of 50-70° C.

Preferably, said soybean raw material is selected from the group consisting of soybean, full fat soybean flakes, defatted soybean flakes, full fat soybean powder, defatted soybean powder, or soybean residuals, wherein said soybean residuals are produced from food processing procedures using soybean as the raw material. More preferably, said soybean raw material is defatted soybean flakes or defatted soybean powder.

In an embodiment of the present invention, the probiotics-containing soybean oligosaccharide product of the invention is used as a food additive.

In another embodiment of the present invention, the probiotics-containing soybean oligosaccharide product of the invention is used as an animal feed additive.

A method for preparing a probiotics-containing soybean oligosaccharide product accomplished in accordance with the present invention comprises the following steps:

(a) extracting a soybean raw material with water under an acidic condition of pH 3-6;
(b) subjecting the extract mixture from step (a) to solid-liquid separation to obtain a solution of acidic soluble saccharides;
(c) adjusting pH of the solution of acidic soluble saccharides to alkaline and then adding a phytic acid precipitating agent thereto to form a precipitation of phytate salts, followed by solid-liquid separation to obtain a solution of crude soybean saccharides;
(d) removing proteins from said solution of crude soybean saccharides, and then removing salts therein to obtain a solution of desalinated soybean saccharides;
(e) inoculating said solution of desalinated soybean saccharides with probiotics for fermentation, and then collecting fermented liquid therefrom; wherein said probiotics are able to decompose monosaccharides and disaccharides, but not trisaccharides or tetrasaccharides.

Preferably, the extraction in step (a) is carried out under a temperature of 50-70° C.

Preferably, the pH of said solution of acidic soluble saccharides in step (c) is adjusted to 8-9, and said phytic acid precipitating agent is calcium carbonate, calcium chloride, magnesium carbonate, or magnesium chloride, wherein calcium carbonate is preferable. More preferably, said calcium carbonate is applied in a percentage of 0.1-0.5%, based on the weight of said solution of acidic soluble saccharides.

Preferably, the method of the invention further comprises a step of concentrating the solution of acidic soluble saccharides obtained in step (b) before step (c).

Preferably, the method of the invention further comprises a step of concentrating the solution of crude soybean saccharides obtained in step (c) before step (d).

Preferably, the method of the invention further comprises a step of concentrating the solution of desalinated soybean saccharides obtained in step (d) before step (e).

Preferably, the method of the invention further comprises a step of concentrating the fermented liquid obtained in step (e) to result in a product in syrup form.

Preferably, the method of the invention further comprises a step of drying the fermented liquid obtained in step (e) to result in a product in powder form.

Preferably, proteins in said solution of crude soybean saccharides are removed by using a microfiltration membrane in step (d), and the resultant filtered liquid undergoes electrodialysis to remove salts therein. More preferably, said microfiltration membrane has a pore size of 0.3 μm.

More preferably, the soybean raw material used in the method of the invention is selected from the group consisting of soybean, full fat soybean flakes, defatted soybean flakes, full fat soybean powder, defatted soybean powder, and soybean residuals, wherein said soybean residuals are produced from food processing procedures using soybean as the raw material.

In an embodiment of the present invention, the fermented liquid obtained in step (e) is used as a food additive.

In another embodiment of the present invention, the fermented liquid obtained in step (e) is used as an animal feed additive.

DETAILED DESCRIPTION OF PREFERRED EMBODIMENTS

The present invention discloses a probiotics-containing soybean oligosaccharide product, and a preparation method comprised of extracting soybean raw materials with an acidic liquid to obtain a solution of acidic soluble saccharides, followed by further refining and selecting probiotic microbes that selectively uses only monosaccharides and disaccharides but not trisaccharides or tetrasaccharides for fermentation, such that the relative concentrations of raffinose and stachyose in the fermented solution of saccharides are significantly elevated, and the final product is allowed to become a synbiotic due to the growth of the probiotics.

The method of acidic extraction used in this invention can result in acidic soluble saccharides that are approximately 15 weight percent of a defatted soybean powder or defatted soybean flakes. Said acidic soluble saccharides includes fructose, glucose, sucrose, raffinose, and stachyose, wherein approximately 50% of the solution is sucrose and monosaccharides, and another 50% is functional raffinose and stachyose. The solution cannot be made into a powder product by a spray drying method directly, because the sucrose therein occupies a relatively high percentage (approximately 40% w/w). Therefore, the present invention includes a step of converting fructose, glucose and sucrose in the solution by microbial fermentation, while leaving raffinose and stachyose intact, such that the relative concentrations of raffinose and stachyose in the fermented solution are significantly elevated.

In a preferred embodiment of the present invention, a soybean syrup Brix 10 to 30 was used as a culture medium for inoculating and culturing lactic acid bacteria ($10^5$ CFU/mL) at 37° C. for 2-3 days. During the process of replicating, the lactic acid bacteria would selectively break down disaccharides and monosaccharide while leaving most of the trisaccharides and tetrasaccharides intact. The lactic acid bacteria grown in this fermentation medium could replicate to a relatively high number of colonies ($10^{10}$ CFU/mL). The resultant final fermented liquid, a further concentrated fermentation liquid, or a powder prepared by spray drying therefrom are synbiotics products that contain both probiotics (lactic acid bacteria) and prebiotics.

The soybean raw material used in this invention is not limited in any ways, and can be soybean, full fat soybean flakes, defatted soybean flakes, full fat soybean powder, defatted soybean powder, or soybean residuals resulted from any processing procedure using soybean as the main raw material, such as: okara (soy pulp) remained from the making of bean curd or soybean milk. Preferably, the raw material is either defatted soybean flakes or defatted soybean powder.

The probiotics used in this invention can be any probiotics that break down only monosaccharides and disaccharides but not trisaccharides or tetrasaccharides, such as *Pediococcus acidilactici, Lactobacillus delbrueckii, Lactobacillus plantarum, Lactobacillus fermentum, Lactococcus lactis,* and *Lactobacillus casei*. Said probiotics may be selected from yeast species of BCRC 20270 (*Saccharomyces cerevisiae*), 21403, 21468, 21469, 21727, 21480 (*Kluyveromyces marxianus*), and 21777 (*Pichia stipitis*). After inoculating a solution of desalinated crude soybean saccharides with probiotics to facilitate fermentation, a sum of the percentages of raffinose and stachyose based on a total weight of saccharides is preferably to be more than 75%, and is more preferably to be 85%.

To achieve desired effects like allowing probiotics to adhere to the intestines and then become effective, if necessary, the probiotics-containing soybean oligosaccharide product of the present invention may be further concentrated, dried and then coated with a coating composition to make a layer-coated product, or be combined with an additive used in the prior art (like one or more of adhesives, excipients, plasticizers, lubricants, masking agents, colorants and preservatives) to make tablets, capsules, powder, fine granules, granules, and sublingual tablets.

The coating composition, adhesives, excipients, plasticizers, lubricants, masking agents, colorants, and preservatives used in the present invention are well known to a person ordinarily skilled in the art and can be applied as required, and do not need to be further limited in any ways.

The probiotics-containing soybean oligosaccharide product prepared according to the present invention can not only be used as a health supplementary food, but also a food additive or an animal feed additive. Said product can be applied in adequate ways and amounts by a person ordinarily skilled in the prior art in the field of this invention as needed.

The present invention will be better understood through the following preferred embodiments, which are merely illustrative and not for limiting the scope of the present invention.

Embodiment 1

1. The preparation of a solution of soybean oligosaccharides includes the following steps:

(1) Extracting a soybean raw material with acid

A solution of soybean acidic soluble saccharides was obtained by extracting a soybean raw material with acid. 100 Kg of defatted soybean powder (which was high-protein soybean flakes purchased from TTET Union Corporation, Taiwan) was obtained then added with quadruple-fold amount of water (w/v) thereto, and a pH of the resulted mixture was adjusted to 3-6 by using an aqueous solution of 16% hydrochloric acid; the mixture was subsequently heated to 50-70° C. and stirred for 5-30 minutes (the mixture was stirred for 10 minutes in this embodiment) before undergoing solid-liquid separation in a press machine for collecting an acidic solution from first pressing. The resulted pressed residuals were subjected to the same conditions mentioned above for a second time of extraction and pressing, and then acidic solutions from the first and second times of pressing were mixed together to result in a solution of saccharides from acid extraction, with a concentration of approximately Brix 6 (saccharides concentration). When producing on a larger scale, the solution of saccharides from acid extraction can be prepared in multiple batches to obtain a large amount thereof, and then followed by adequate concentrating and subsequent refining processes on a large scale.

(2) Removing impurities from the solution of soybean acidic soluble saccharides

The solution of soybean acidic soluble saccharides was subjected to centrifugation to further remove insoluble residuals, which may be replaced by any methods of solid-liquid separation known in the prior art such as filtration; the resultant clarified solution was then added into an aqueous solution of 40% NaOH to adjust a pH thereof to 8-9, followed by the addition of 0.1-0.5% (w/w) of calcium carbonate (which can be replaced by calcium chloride, magnesium carbonate or magnesium chloride) thereto and heating to 90° C. for 10 minutes, which effectively precipitated out the phytic acid in the extracted solution as salts. Subsequently, the mixture underwent solid-liquid separation (centrifugation) to obtain a clarified solution of crude soybean saccharides, and a pH thereof was adjusted to 7.

(3) Refining

The purpose of this step is to remove proteins and salts from the solution of crude saccharides. A method adequate for this purpose is to filter the solution of crude saccharides by using a microfiltration membrane (0.3 μm), and then subject the filtered solution to electrodialysis. Firstly, 280 Kg of concentrated solution of crude soybean saccharides (Brix 18.6) was filtered by using the microfiltration membrane for 4 hours, which resulted in 270 Kg of clarified solution (Brix 16.3) and achieved a recovery rate of 85% (for which the protein concentration was lowered); this was followed by cycled electrodialysis (Micro Acilyzer G5, Asahi Co.), which lowered the conductivity of the solution from 32 mS/cm to 10 mS/cm, and also reduced the salts concentration from 1.34% to 0.07%. The recovered dialysate was 260 Kg (Brix 13.9) and achieved a recovery rate of 80%, and the removal rate of the salts was estimated to be 95%, while the retention rate of the soluble solids (Brix) was 69.4%. The desalinated solution of soybean saccharides was further concentrated to Brix 15 for fermentation in the next stage.

2. Culturing probiotics in the solution of desalinated soybean saccharides

Subsequently, lactic acid bacteria and yeasts that are able to decompose monosaccharides and disaccharides but not trisaccharides or tetrasaccharides were selected from the BCRC microbial database of Food Industry Research and Development Institute, Taiwan.

In regard to fermentation by the lactic acid bacteria, the lactic acid bacteria ferment the solution of desalinated soybean saccharides by converting sucrose, fructose and glucose therein, such that the concentration of monosaccharides and disaccharides in said solution was reduced, thereby elevating the relative concentrations of oligosaccharides like raffinose and stachyose therein. The probiotics used here can be strains of *Pediococcus, Lactobacillus*, or *Bifidobacterium*. They were adequately activated before being inoculated into the solution of desalinated soybean saccharides and cultured at 37° C. for 24-72 hours (by which time they had reached the stationary phase), and a fermented liquid thereof was collected subsequently.

For the culturing and fermentation of the solution of desalinated soybean saccharides, strains of lactic acid bacteria like *Pediococcus acidilactici* BCRC11064, *Lactobacillus delbrueckii* BCRC12297, *Lactobacillus plantarum* BCRC12327, *Lactobacillus fermentum* BCRC10360, *Lactococcus lactis* BCRC12312, or *Lactobacillus casei* BCRC10697 were selected in this embodiment. Firstly, an inoculating loop was used to obtain a loopful of bacteria from a glycerine vial, and then inoculated the bacteria into 5 mL of MRS medium for culturing in a 37° C. incubator for 24 hours; the resulted bacterial liquid was further inoculated into 10 mL of MRS medium at a concentration of 1% (v/v) for culturing at 37° C. for 18 hours; the final bacterial liquid was used as an inoculant for inoculating and fermenting the solution of desalinated soybean saccharides subsequently. Afterwards, 300 mL of the solution of desalinated soybean saccharides with a concentration of Brix 15 was added into a 500 mL grooved flask to be used as a medium for shaking culture, the medium was inoculated with 1% (v/v) of bacteria before being cultured at 37° C. for 24 hours, and the resultant fermented liquid was centrifuged (3000 rpm for 10 minutes) to remove bacterial bodies and obtain a supernatant liquid. The supernatant liquid was then analyzed by HPLC (High Performance Liquid Chromatography) with Hibar 250-4 LiChrosorb NH2 separation columns and an ELSD (Evaporative Light Scattering Detector) to find out concentrations of fructose, glucose, sucrose, raffinose, and stachyose in the fermented liquid. The results are shown in Table 1, which shows that the lactic acid bacteria have effectively converted and utilized the glucose in the solution of desalinated soybean saccharides, whereas 22% to 62% of fructose was consumed. And the conversion efficiency of sucrose was different for different types of lactic acid bacteria, in which *Lactobacillus plantarum* BCRC 12327 show better conversion efficiency compared to others. For all types of bacterial strain used, the remaining concentrations of raffinose and stachyose are greater than 76%. As for the ratio between the combined weight percentage of raffinose and stachyose versus that of the total saccharides, *Lactobacillus plantarum* give rise to comparatively better results (referring to Table 1).

TABLE 1

Comparing the conversion efficiency of saccharides among different types of lactic acid bacteria

| Strains of lactic acid bacteria | Fructose (g/L) | Glucose (g/L) | Sucrose (g/L) | Raffinose (g/L) | Stachyose (g/L) | Total saccharides* (g/L) | (Raffinose + Stachyose)/ total saccharides |
|---|---|---|---|---|---|---|---|
| Saccharide solution (Brix 15) | 8.91 | 0.90 | 47.82 | 12.43 | 43.59 | 113.65 | 0.49 |
| Pediococcus acidilactici BCRC11064 | 4.00 | 0.00 | 38.13 | 9.60 | 33.30 | 85.03 | 0.50 |
| Lactobacillus delbrueckii BCRC12297 | 6.92 | 0.42 | 42.10 | 10.67 | 37.35 | 97.47 | 0.49 |
| Lactobacillus plantarum BCRC12327 | 4.21 | 0.00 | 24.07 | 10.06 | 36.63 | 74.97 | 0.62 |
| Lactobacillus fermentum BCRC10360 | 3.45 | 0.00 | 44.90 | 13.56 | 27.69 | 89.60 | 0.46 |
| Lactococcus lactis BCRC12312 | 5.03 | 0.00 | 44.44 | 11.34 | 40.41 | 101.21 | 0.51 |
| Lactobacillus casei BCRC10697 | 4.65 | 0.00 | 44.39 | 11.73 | 40.26 | 101.03 | 0.51 |

*Total saccharides = fructose + glucose + sucrose + raffinose + stachyose

Bacterial strains were selected according to the principle of which strain consumes the most sucrose and the least raffinose and stachyose. When Lactobacillus plantarum was selected as the working strain, it was found that by culturing the bacteria in a Brix 30 solution of desalinated soybean saccharides for 96 hours, the weight percentage of raffinose and stachyose versus that of the total saccharides reached 85% (referring to Table 2).

TABLE 2

| Strains of lactic acid bacteria | Fructose (g/L) | Glucose (g/L) | Sucrose (g/L) | Raffinose (g/L) | Stachyose (g/L) | Total saccharides* (g/L) | (Raffinose + Stachyose)/ total saccharides |
|---|---|---|---|---|---|---|---|
| Saccharide solution (Brix 30) | 12.97 | 1.29 | 71.93 | 19.80 | 59.15 | 165.14 | 0.48 |
| Lactobacillus plantarum | 6.85 | 0.00 | 5.44 | 17.96 | 52.73 | 82.97 | 0.85 |

*Total saccharides = fructose + glucose + sucrose + raffinose + stachyose

Embodiment 2

A probiotics-containing soybean oligosaccharide product was prepared under the following operating conditions. A 5L fermentation tank was used for culturing, with the solution of desalinated soybean saccharides of Brix 10-30 prepared in Embodiment 1 used as a culture medium. Firstly, 0.1% to 1% (v/v) of yeast extracts were added into 2.5L of said solution, for which 1-5% of lactic acid bacterial inoculant (Lactobacillus plantarum BCRC12327) was used; said solution was allowed to ferment for 2-3 days, and a pH of resultant fermented liquids was controlled at between 4.5 to 6.5. The results show that sucrose and glucose in the fermented liquids are almost depleted, and the count of lactic acid bacteria therein reach $10^{10}$ CFU/mL; the weight ratio of the combined two oligosaccharides including raffinose and stachyose to the total saccharides is greater than 85%.

A preferable preparation method was to use 2.5L of the solution of desalinated soybean saccharides of Brix 15 from Embodiment 1 as a culture medium, then added 0.5% (v/v) of yeast extracts thereto before inoculating said solution with 1% (v/v) of lactic acid bacterial inoculant (Lactobacillus plantarum BCRC12327), said solution was then cultured for two days at 37° C., with a pH thereof controlled at 5.5. After fermentation, the count of lactic acid bacteria therein reaches $10^{10}$ CFU/mL, and the weight ratio of the combined oligosaccharides to the total saccharides reaches 90%.

Embodiment 3

In this embodiment, yeasts were used for facilitating fermentation. Seven strains of yeasts were selected for culturing, which included BCRC 20270 (Saccharomyces cerevisiae), 21403, 21468, 21469, 21727, 21480 (Kluyveromyces marxianus), and 21777 (Pichia stipitis). YM plates were used to activate strains of yeasts, and then shaking culture was carried out using grooved flasks. Once the concentration (OD600) of a strain had reached 25-30 after one day of fermentation, the strain could subsequently be treated as stable, and used as an inoculant for the following fermentation.

A 5L fermentation tank was used for fermenting and culturing of the seven strains of yeasts, in which the solution of desalinated soybean saccharides of Brix 27 from Embodiment 1 was used as a culture medium, culturing was carried out under the conditions of 30° C., 200 rpm, 1 vvm, pH 5.5-6.5, and for 24-48 hours. It was found that the yeasts BCRC 21403 and 21777 resulted in the highest OD600 values, indicating the highest growth in the medium. In regard to the concentration of oligosaccharides, the percentages between the combined weight of two oligosaccharides including raffinose and stachyose versus that of the total saccharides are 76-80% in the fermented liquids resulted from fermenting the solution of desalinated soybean saccharides with the yeasts BCRC 20270, 21403, 21469, and 21727. All of the fermented liquids resulted from using the other three strains of yeasts have lower concentrations of oligosaccharides, which were 47% to 52% (please refer to Table 3).

TABLE 3

Oligosaccharide concentrations resulted from using different yeast strains to ferment the solution of desalinated soybean saccharides

| Strains of yeasts | (Raffinose + Stachyose)/total saccharides |
|---|---|
| BCRC 20270 | 0.76 |
| BCRC 21403 | 0.78 |
| BCRC 21468 | 0.48 |
| BCRC 21469 | 0.76 |
| BCRC 21480 | 0.47 |
| BCRC 21727 | 0.80 |
| BCRC 21777 | 0.52 |

Embodiment 4

In this embodiment, the method of spray drying was used to prepare a probiotics-containing soybean oligosaccharide product in powder form. The solution of soybean oligosaccharides obtained from fermentation by *Lactobacillus plantarum* BCRC 12327 can be concentrated to result in a product in syrup form by using any previously known methods. The product in syrup form can be treated as the final product as dependent on purposes thereof, or further with water being removed therefrom by using any previously known methods, and results in a lactic acid bacteria-containing soybean oligosaccharide product in powder form.

According to Embodiment 1, one tone of the solution of soybean oligosaccharides resulted from fermentation by *Lactobacillus plantarum* was obtained, then continuously processed by using a depressurizing concentrator at 50-70° C. to give rise to a concentrated solution of soybean oligosaccharides, with a concentration of Brix 30-40. Maltodextrin was then added into the concentrated solution of soybean oligosaccharides at an amount equal to that of the solid substances of said solution, and then dried by using an Okawara L-8 spray drying machine; the drying condition was set as having the entry temperature at 140-150° C., and the exit temperature at 75-80° C. Table 4 shows the results from two different rounds of operation; the combined concentration of oligosaccharides (raffinose+stachyose) in the probiotics-containing soybean oligosaccharide powdery product reaches more than 28% (w/w), and the live count of the lactic acid bacterium *Lactobacillus plantarum* is still kept at $10^9$ (CFU/g).

Table 4 displays the analysis of the ingredients in the probiotics-containing soybean oligosaccharide powder

What is claimed is:

1. A method for preparing a probiotics-containing soybean oligosaccharide product comprising the following steps:
   (a) extracting a soybean raw material with water under an acidic condition of pH 3-6;
   (b) subjecting the extract mixture from step (a) to solid-liquid separation to obtain a solution of saccharides;
   (c) adjusting pH of the solution of saccharides to alkaline and then adding a phytic acid precipitating agent thereto to form a precipitation of phytate salts, followed by solid-liquid separation to obtain a solution of crude soybean saccharides;
   (d) removing proteins from said solution of crude soybean saccharides, and then removing salts therein to obtain a solution of desalinated soybean saccharides;
   (e) inoculating said solution of desalinated soybean saccharides with probiotics for fermentation, and then collecting fermented liquid therefrom;
   wherein:
   said probiotics are able to decompose monosaccharides and disaccharides but not trisaccharides or tetrasaccharides; and
   said product comprises saccharides of soybean and probiotics, wherein said saccharides of soybean comprise fructose, glucose, sucrose, raffinose, and stachyose with a percentage of a combined weight of raffinose and stachyose being greater than 46%, a weight percentage of fructose being not greater than 8.5%, and a weight percentage of glucose being not greater than 1.0%, based on the total weight of fructose, glucose, sucrose, raffinose, and stachyose.

2. The method of claim 1, wherein the extraction in step (a) is carried out at a temperature of 50-70° C.

3. The method of claim 1, wherein the pH of 3-6 in step (a) is obtained by addition of hydrochloric acid.

4. The method of claim 1, wherein the phytic acid precipitating agent used in step (c) is calcium carbonate, calcium chloride, magnesium carbonate, or magnesium chloride.

5. The method of claim 1, wherein the pH of said solution of saccharides in step (c) is adjusted to 8-9, and said phytic acid precipitating agent is calcium carbonate.

6. The method of claim 5, wherein said calcium carbonate is applied in a percentage of 0.1%-0.5%, based on the weight of said solution of saccharides.

7. The method of claim 1 further comprising a step of concentrating the solution of saccharides obtained in step (b) before step (c).

8. The method of claim 1 further comprising a step of concentrating the solution of crude soybean saccharides obtained in step (c) before step (d).

9. The method of claim 1 further comprising a step of concentrating the solution of desalinated soybean saccharides obtained in step (d) before step (e).

| | Coarse proteins (%) | Coarse fats (%) | Ash content (%) | Water (%) | Oligosaccharides (HPLC analysis, %) | Carbohydrates (%) | Lactic acid bacteria count (CFU/g) |
|---|---|---|---|---|---|---|---|
| Soybean oligosaccharide powder 1 | 5.05 | 0 | 9.94 | 5.14 | 28.4 | 79.87 | $1.62 \times 10^9$ |
| Soybean oligosaccharide powder 2 | 4.97 | 0 | 10.52 | 5.35 | 28.5 | 79.16 | $3.7 \times 10^9$ |

10. The method of claim 1 further comprising a step of concentrating the fermented liquid obtained in step (e) to result in a product in syrup form.

11. The method of claim 1 further comprising a step of drying the fermented liquid obtained in step (e) to result in a product in powder form.

12. The method of claim 1, wherein step (d) comprises removing proteins in said solution of crude soybean saccharides by using a microfiltration membrane, and subjecting a resultant filtered liquid to electrodialysis to remove salts therein.

13. The method of claim 12, wherein said microfiltration membrane has a pore size of 0.3 μm.

14. The method of claim 1, wherein said probiotics are *Pediococcus acidilactici, Lactobacillus delbrueckii, Lactobacillus plantarum, Lactobacillus fermentum, Lactococcus lactis*, or *Lactobacillus casei*.

15. The method of claim 14, wherein said probiotics are *Lactobacillus plantarum*.

16. The method of claim 1, wherein said probiotics are selected from the group consisting of yeast species of BCRC 20270 (*Saccharomyces cerevisiae*), 21403, 21468, 21469, 21727, 21480 (*Kluyveromyces marxianus*), and 21777 (*Pichia stipitis*).

17. The method of claim 1, wherein said soybean raw material is selected from the group consisting of soybean, full fat soybean flakes, defatted soybean flakes, full fat soybean powder, defatted soybean powder, and soybean residuals, in which said soybean residuals are produced from food processing procedures using soybean as a raw material.

18. The method of claim 17, wherein said soybean raw material is defatted soybean flakes or defatted soybean powder.

19. The method of claim 1, wherein the percentage of the combined weight of raffinose and stachyose is 49%-85%, and the weight percentage of glucose is not greater than 0.5%, based on the total weight of fructose, glucose, sucrose, raffinose, and stachyose.

20. The method of claim 1, wherein the percentage of the combined weight of raffinose and stachyose is 75%-85%, based on the total weight of fructose, glucose, sucrose, raffinose, and stachyose.

21. The method of claim 1, wherein said probiotics are able to decompose monosaccharides and disaccharides, but not trisaccharides or tetrasaccharides.

22. The method of claim 1, wherein the product comprises $1.0 \times 10^9$ CFU/g–$9.9 \times 10^{10}$ CFU/g probiotics.

* * * * *